Aug. 18, 1964

J. J. SWINNEY 3,145,007

TROUGH SUPPORT

Filed April 29, 1963

INVENTOR.
JOHN J. SWINNEY

BY
Newton, Hopkins & Jones
ATTORNEYS

Aug. 18, 1964    J. J. SWINNEY    3,145,007
TROUGH SUPPORT
Filed April 29, 1963    2 Sheets—Sheet 2
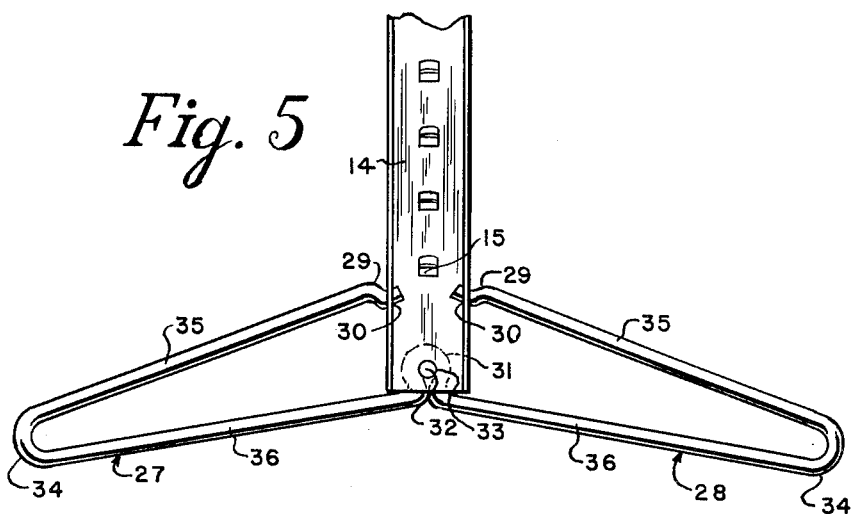
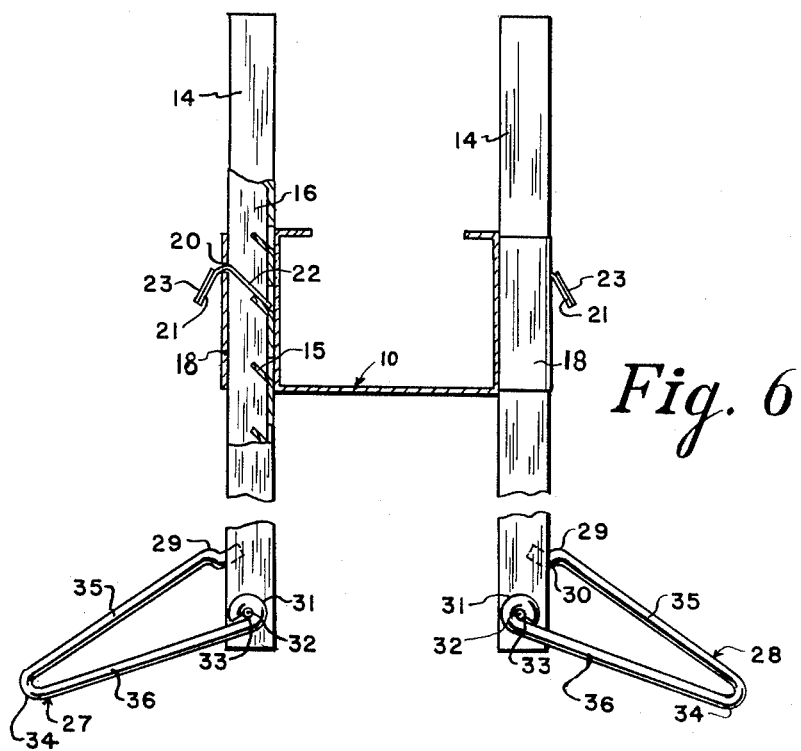
INVENTOR.
JOHN J. SWINNEY
BY
Newton, Hopkins & Jones
ATTORNEYS United States Patent Office 3,145,007
Patented Aug. 18, 1964

3,145,007
TROUGH SUPPORT
John J. Swinney, Canton, Ga., assignor to Bradshaw
Manufacturing Co., Inc., Canton, Ga., a corporation of
Georgia
Filed Apr. 29, 1963, Ser. No. 276,381
8 Claims. (Cl. 248—149)

This invention relates to supporting devices and more particularly to a trough support having means for selectively adjusting the height of a trough supported by it.

It is desirable that troughs such as those used for poultry watering and feeding be adjustable to various heights. This is because a non-adjustable trough low enough for small birds to reach is too low for large birds. Conversely, if the non-adjustable trough is high enough for large birds, small birds must perch on the edge of the trough to reach the contents of the trough.

In order to provide a trough suitable for use by either small or large birds, various types of adjustable troughs have been devised. Some of these previous adjustable troughs have used screw arrangements for adjusting the height of the trough. These screw arrangements have made these previous troughs complex and difficult both to manufacture and to use.

Other previous troughs have provided for height adjustment by arrangements permitting the tilting of the trough. Such arrangements are inconvenient when the trough is full of water or feed. Moreover, most of these previous adjustable troughs and their supports have been made as a single unit and where the supports have included transverse stands or feet, the single unit has had an awkward shape and has been difficult to package, ship or store.

The trough support disclosed herein overcomes these previous problems with troughs by providing a trough support which permits the height of a trough to be conveniently and easily adjusted to the most desirable height for the birds for whom the trough is being used. The trough support comprising a plurality of stanchions with each stanchion having a trough carrying sleeve surrounding the stanchion. Each sleeve has a pawl which cooperates with a ratchet on the stanchion to provide convenient unidirectional movement of the sleeve on the stanchion. The pawl is manually releasable from the ratchet so that movement of the sleeve in the opposite direction is possible. It is between the sleeves that the trough is carried and the easy and convenient positioning of the sleeves on the stanchion permits easy and convenient adjusting of the height of the trough.

Each of the stanchions has a foot to provide vertical stability to the stanchion. The foot of each stanchion can be rotated into alignment with the vertical member of the stanchion for ease in packaging, shipping or storing the trough support. The trough support is easy to assemble and can be shipped unassembled for assembly by the user. This further reduces manufacturing and shipping costs.

These and other features and advantages of the invention will be more clearly understood from the following detailed description and the accompanying drawings in which like characters of reference designate corresponding parts in all figures and in which:

FIG. 5 is a side elevational view of the lower portion and foot of a stanchion.

FIG. 6 is a side elevational view, partially in cross section, of a third embodiment of the trough support.

These figures and the following detailed description disclose a preferred specific embodiment of the invention, but the invention is not limited to the details disclosed since it may be embodied in other equivalent forms.

Figure 1:
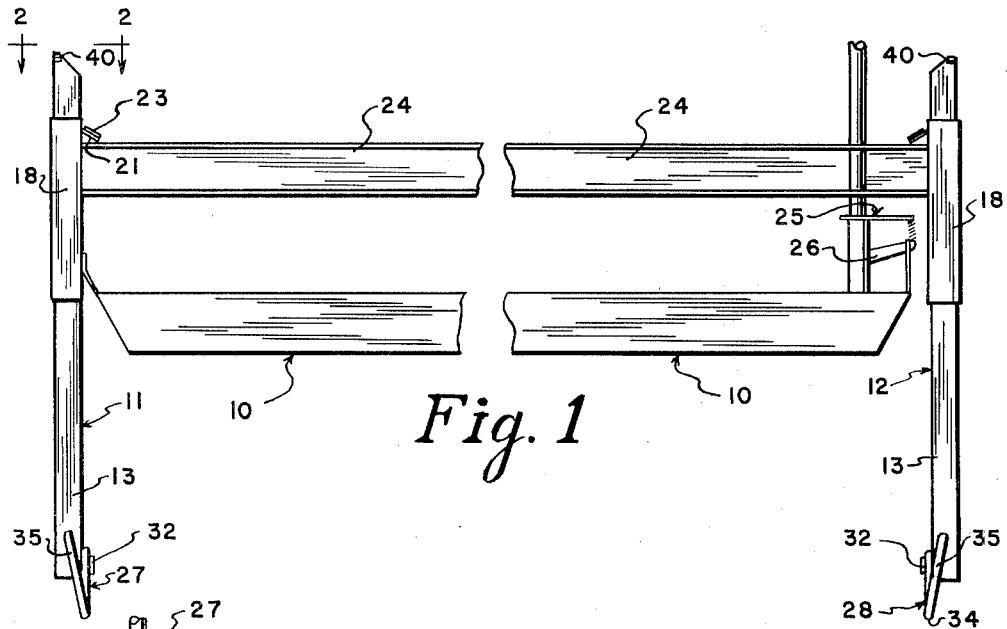
FIG. 1 is a front elevational view of a conventional poultry watering trough supported by an embodiment of the trough support.
Figure 2:
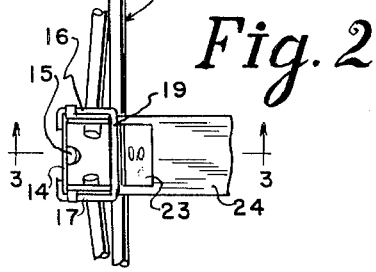
FIG. 2 is a top plan view of one of the stanchions of the embodiment of the trough support shown in FIG. 1 as viewed in line 2—2 in FIG. 1.
Figure 3:
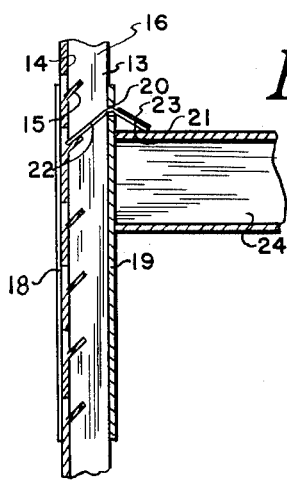
FIG. 3 is a cross sectional view taken substantially in the line 3—3 in FIG. 2.

This invention is best understood as comprising a plurality of vertical stanchions between which a trough 10 is supported. In the embodiment of the invention shown in FIG. 1, the trough 10 is supported between two vertical stanchions. Each stanchion comprises a channel shaped vertical member 13 having a central web 14. The central web 14 of each vertical member 13 has a plurality of tongues punched inwardly of the channel to form the teeth 15 of a ratchet bounded by the two sides 16 and 17 of the vertical member 13. The ratchet teeth 15 can extend over any desired length of the central web 14 of the vertical member 13 depending upon the range of trough height adjustment desired.

Slidably positioned on each of the plurality of stanchions is a sleeve 18. The sleeve 18 surrounds the vertical member 13 so as to provide a closure plate 19 opposite the central web 14 of the vertical member 13. Together, the vertical member 13 and the sleeve 18 form a chamber bounded by the central web 14 and the sides 16 and 17 of the vertical member 13 and the closure plate 19 of the sleeve 18. The chamber is substantially rectangular in cross section and the teeth 15 of the ratchet extend into it. Preferably the sleeve 18 is partially open on that side coextensive with the central web 14 so as to allow it to be formed on a brake or by rollers rather than extruded. However, a sleeve 18 closing upon itself is completely satisfactory even though it is more expensive and difficult to manufacture than a partially closed sleeve 18.

Each sleeve 18 has a slit 20 in the closure plate 19. A lever arm 21 extends through the slit 20 in the closure plate 19 and joins a pawl 22 and a release plate 23. The pawl 22 is placed within the chamber formed by the sides 16 and 17 and the central web 14 of the vertical member 13 and the closure plate 19 of the sleeve 18. The pawl 22 is substantially rectangular and has a width substantially equal to the distance between the sides 16 and 17 of the vertical member 13 and a length greater than the distance between the central web 14 of the vertical member 13 and the closure plate 19 of the sleeve 18. Thus, the pawl 22 fits within the chamber formed by the sleeve 18 and the vertical member 13 only in an inclined attitude and is positioned within the chamber sloping downward from the slit 20. As a result, when the underside of the pawl 22 is engaged by one of the plurality of teeth 15 as the sleeve 18 and pawl 22 slide down the vertical member 13, the pawl 22, the lever arm 21 and the release plate 23 will pivot about the slit 20 in the closure plate 19 only until the pawl 22 becomes wedged in an inclined position between the slit 20 and the central web 14 of the vertical member 13. In this wedged position, the pawl 22 will prevent the sleeve 18 from sliding further down the vertical member 13.

The pawl 22 will pivot freely downward into a position in which it is substantially parallel to and against the closure plate 19. In this downward or almost vertical position, the pawl 22 is not engaged by any of the teeth 15 of the ratchet and the sleeve 18 will slide freely either upward or downward along the vertical member 13. The pawl 22 is urged out of this vertical position by the weight of the release plate 23 on the opposite side of the slit 20 from the pawl 22. The weight of the release plate 23 is sufficient to maintain the pawl 22 in an inclined position, but the weight of the release plate 23 is not so great as to prevent the pawl 22 from pivoting downward toward the closure plate 14 when the upper side of the pawl 22 is engaged by the teeth 15 of the ratchet as the sleeve 18 is slid upward on the vertical member 13. This arrangement permits the sleeve 18 to be freely slid upward along the vertical member 13 with the pawl 22 pivoting each time it engages a tooth 15 of the ratchet and insures that the pawl 22 will be in inclined position so that its underside will be engaged by a tooth 15 of the ratchet as soon as this upward movement stops and the sleeve 18 starts to move downward.

The sleeve 18 on a vertical member 13 is lowered by manually grasping the release plate 23 and moving it upward so as to pivot the pawl 22 downward into a sufficiently vertical position to prevent its underside from being engaged by any of the teeth 15 of the ratchet. This is most easily accomplished by raising the sleeve 18 slightly before pivoting the pawl 22 downward since such slight upward movement of the sleeve 18 will permit the pawl 22 to easily clear the tooth of the ratchet which was previously engaging the underside of the pawl 22. Thus, the sleeve 18 on a vertical member 13 will slide freely up the vertical member 13 into any desired vertical position and will, with the release plate 23 raised, slide down the vertical member 13 into any desired position. A tab 40 near the top of the vertical member 13 prevents the sleeve 18 from sliding completely off the upper end of the vertical member 13 and a foot member serves a similar purpose with respect to the lower end of the vertical member 13.

A trough 10 is adjustably positioned by structurally relating the vertical position of the trough 10 to the vertical position of a plurality of sleeves 18 on a plurality of vertical members 13 of a plurality of stanchions. In the specific embodiment of the invention shown in FIG. 1, the sleeve 18 on a left stanchion 11 is attached rigidly by a beam 24 to a sleeve 18 on the right stanchion 12. The beam 24 extends horizontally between the sleeve 18 on the left stanchion 11 and the sleeve 18 on the right stanchion 12 and with the foot member at the lower end of each of the stanchions 11 and 12 serves to maintain the stanchions 11 and 12 in vertical position.

A trough 10 is positioned between the sleeve 18 on the left stanchion 11 and the sleeve 18 on the right stanchion 12 by pivotally attaching it in known manner at one end to the sleeve 18 on the left stanchion 11 and by attaching it in known manner to the end of a water valve structure 25 fixedly extending through the beam 24 adjacent to the right stanchion 12. When it is desired to raise the trough 10 it is simply necessary to raise the positions of the sleeves 18 on the stanchions 11 and 12 and when it is desired to lower the trough 10 it is simply necessary to lower the positions of the sleeves 18 on the stanchions 11 and 12.

The trough 10 is of conventional type, well known in the art. The weight of the trough 10 alone will allow the arm 26 of the water valve 25 to raise and open the valve 25 so as to fill the trough. The weight of the trough 10 full of water will pull the arm 26 down and close the valve 25 to cut off the flow of water.

The foot member at the lower end of each of the stanchions 11 and 12 is comprised of two loops 27 and 28 extending in opposite directions from the lower end of the stanchions 11 or 12. Each loop 27 or 28 has a crooked end 29 inserted through a hole 30 in the side 16 or 17 of the vertical member 13 and a lower end formed into a ring 31 through which a pin 32 inserted through a hole 33 in the central web 14 of vertical member 13 is inserted. Each loop 27 or 28 has a contact point 34 formed between its crooked end 29 and the ring 31. The contact point 34 of each loop 27 or 28 is in a plane perpendicular to the vertical member 13 and will prevent the vertical member 13 from tilting in the direction in which the loop 27 or 28 extends by engaging the ground, floor or other supporting surface.

The loops 27 and 28 pivot about the pin 32 in a vertical plane substantially perpendicular to the beam 24 when the crooked end 29 of each loop 27 or 28 is free. The loops 27 and 28 are of resilient material and the crooked end 29 of each loop 27 and 28 is removed from the hole 30 in the side 16 or 17 of the vertical member 13 by forcing the upper side 35 of the loop toward the lower side 36 of the loop while at the same time rotating the loop 27 or 28 about the pin 32 away from the vertical member 13. Once the crooked end 29 of a loop 27 or 28 is removed from a hole 30 in the vertical member 13, the loop 27 or 28 may be rotated until the contact point 34 extends downward in the same direction as the vertical member 13. After both loops 27 and 28 have been rotated into this position by disengaging their crooked ends 29 from the holes 30 in the vertical member 13, the trough support becomes a substantially two dimensional structure easy to package, ship or store.

Figure 4:
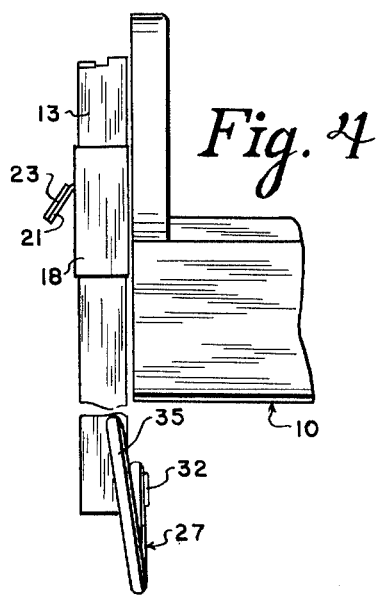
FIG. 4 is an enlarged fragmentary front elevational view of the stanchion of a second embodiment of the trough support.

In the embodiment of the invention shown in FIG. 4, the trough 10 to be supported is rigidly attached at each end directly to one of the plurality of sleeves 18. The rigid attaching of the trough 10 to the plurality of sleeves 18 prevents the vertical members 13 of the stanchions from tilting toward each other since the trough 10 serves the same purpose as the beam 24 in the embodiment shown in FIG. 1.

In the embodiment of the invention shown in FIG. 6 a pair of stanchions are used at each end of a trough 10 to provide support for the trough 10. Each end of the trough is rigidly attached to and between the sleeves 18 on the pair of stanchions. However, regardless of the specific embodiment of the trough support, the trough support permits the trough 10 to be raised simply by manually raising its position into the desired position and once the trough 10 is raised to the desired position, the pawl 22 carried by each of a plurality of sleeves 18 will engage a tooth 15 extending into the chamber of each of the plurality of stanchions used in the embodiment. The trough 10 may be lowered to any position by simply grasping the release plate 23 associated with each of a plurality of sleeves 18 and raising it to move the pawl 22 from tooth 15 engaging position so as to permit the trough 10 to lower to that position desired. Moreover, regardless of the embodiment used, the pivotable loops 27 and 28 permit the width of the trough support to be substantially reduced by simply rotating the loops 27 and 28 until they are in alignment with the vertical members 13 of the stanchions. This facilitates storage of the trough support whether it is detachable from the trough 10 which it supports or whether it is integral with the trough which it supports. Moreover, it is readily apparent that the trough support is easy and convenient to manufacture and may be shipped in unassembled form since it is easy and convenient to assemble.

It will be obvious to those skilled in the art that many variations may be made in the embodiments here chosen for the purpose of illustrating the present invention without departing from scope thereof as defined by the appended claims.

What is claimed as invention is:

1. A device for supporting a trough having a first end and a second end, said device comprising, in combination, a first stanchion and a second stanchion, each stanchion having a vertical member with two parallel sides, a plurality of tongues extending from the central web and between the parallel sides to form the teeth of a ratchet, a sleeve slidably positioned on the vertical member and having a closure plate with a slit and which with the sides and the central web of the vertical member forms a four sided chamber, a lever inserted through and pivotable in the said slit and having an inner end within the said chamber and an outer end outside the said chamber, a pawl fixedly attached to and extending downward from the inner end of the lever and having a width substantially equal to the distance in the said chamber between the sides of the vertical member and a length greater than the distance in said chamber between the central web of the vertical member and the closure plate, a release plate fixedly attached to the outer end of the lever and having weight sufficiently great to pivot the pawl upward in the said chamber but not so great as to substantially resist the pivoting of the pawl downward when the pawl is engaged by a tooth of the ratchet, a pin extending from and perpendicular to the central web of the vertical member, a right loop with a ring at its first end enclosing the said pin and with its second end fixedly but removably engaging the first side of the vertical member and having a segment between its first end and its second end which is remote from the vertical member and in a plane parallel to the central web and a plane perpendicular to the vertical member at its lower end, a left loop with a ring at its first end enclosing the said pin and with its second end fixedly but removably engaging the second side of the vertical member and having a segment between its first end and its second end which is remote from the vertical member and on the opposite of the vertical member from the left loop in a plane parallel to the central web and a plane perpendicular to the vertical member at its lower end; a horizontal beam extending between the sleeve on the first stanchion and the sleeve on the second stanchion; and means for fixedly attaching the first end of a trough to the sleeve on the first stanchion and the second end of the trough to the sleeve on the second stanchion.

2. A device for supporting a trough having a first end and a second end, said device comprising, in combination, a first stanchion and a second stanchion, each stanchion having a vertical member with two parallel sides and a central web between and perpendicular to the parallel sides, a plurality of tongues extending from the central web and between the parallel sides to form the teeth of a ratchet, a sleeve slidably positioned on the vertical member and having a closure plate with a slit and which with the sides and the central web of the vertical member forms a four sided chamber, a lever inserted through and pivotable in the said slit and having an inner end within the said chamber and an outer end outside the said chamber, a pawl fixedly attached to and extending downward from the inner end of the lever and having a width substantially equal to the distance in the said chamber between the sides of the vertical member and a length greater than the distance in said chamber between the central web of the vertical member and the closure plate, a release plate fixedly attached to the outer end of the lever and having weight sufficiently great to pivot the pawl upward in the said chamber but not so great as to substantially resist the pivoting of the pawl downward when the pawl is engaged by a tooth of the ratchet, a pin extending from and perpendicular to the central web of the vertical member, a right loop with a ring at its first end enclosing the said pin and with its second end fixedly but removably engaging the first side of the vertical member and having a segment between its first end and its second end which is remote from the vertical member and in a plane parallel to the central web and a plane perpendicular to the vertical member at its lower end, a left loop with a ring at its first end enclosing the said pin and with its second end fixedly but removably engaging the second side of the vertical member and having a segment between its first end and its second end which is remote from the vertical member and on the opposite of the vertical member from the left loop in a plane parallel to the central web and a plane perpendicular to the vertical member at its lower end; and means for fixedly attaching the first end of a trough to the sleeve on the first stanchion and the second end of a trough to the sleeve on the second stanchion.

3. A device for supporting a trough having a first end and a second end, said device comprising, in combination, a plurality of left stanchions and a plurality of right stanchions, each left stanchion and each right stanchion having a vertical member with two parallel sides and a central web between and perpendicular to the parallel sides, a plurality of tongues extending from the central web and between the parallel sides to form the teeth of a ratchet, a sleeve slidably positioned on the vertical member and having a closure plate with a slit and which with the sides and the central web of the vertical member forms a four sided chamber, a lever inserted through and pivotable in the said slit and having an inner end within the said chamber and an outer end outside the said chamber, a pawl fixedly attached to and extending downward from the inner end of the lever and having a width substantially equal to the distance in the said chamber between the sides of the vertical member and a length greater than the distance in said chamber between the central web of the vertical member and the closure plate, a release plate fixedly attached to the outer end of the lever and having weight sufficiently great to pivot the pawl upward in the said chamber but not so great as to substantially resist the pivoting of the pawl downward when the pawl is engaged by a tooth of the ratchet, a pin extending from and perpendicular to the central web of the vertical member, a right loop with a ring at its first end enclosing the said pin and with its second end engaging the first side of the vertical member, and having a segment between its first end and its second end which is remote from the vertical member and in a plane parallel to the central web and a plane perpendicular to the vertical member at its lower end, a left loop with a ring at its first end enclosing the said pin and with its second end engaging the second side of the vertical member and having a segment between its first end and its second end which is remote from the vertical member and on the opposite of the vertical member from the left loop in a plane parallel to the central web and a plane perpendicular to the vertical member at its lower end; and means for fixedly attaching the first end of the trough to the sleeves of the plurality of left stanchions and the second end of the trough to the sleeves of the plurality of right stanchions.

4. A stanchion providing a point of support for a structure which is vertically adjustable with respect to a support surface, said stanchion comprising, in combination, a vertical member with two parallel sides and a central web between and perpendicular to the parallel sides; a plurality of tongues extending from the central web and between the parallel sides to form the teeth of a ratchet; a sleeve slidably positioned on the vertical member and having a closure plate with a slit and which with the sides and the central web of the vertical member forms a four sided chamber; a lever inserted through and pivotable in the said slit and having an inner end within the said chamber and an outer end outside the said chamber; a pawl fixedly attached to and extending downward from the inner end of the lever, said pawl having a width substantially equal to the distance in the said chamber between the sides of the vertical member and a length greater than the distance in said chamber between the central web of the vertical member and the closure plate; a release plate fixedly attached to the outer end of the lever and having weight sufficiently great to pivot the pawl upward in the said chamber but not so great as to substantially resist the pivoting of the pawl downward when the pawl is engaged by a tooth of the ratchet, a pin extending from and perpendicular to the central web of the vertical member; a right loop with a ring at its first end enclosing the said pin and with its second end removably engaging a side of the vertical member, said right loop having a segment between its first end and its second end which is remote from the vertical member and which engages the support surface when the vertical member is in a vertical attitude; a left loop with a ring at its first end enclosing the said pin and having its second end removably engaging a side of the vertical member, said left loop having a segment between its first end and its second end which is remote from the vertical member and which engages the support surface on the opposite side of the vertical member from the segment of the right loop; and means for attaching the structure to the sleeve.

5. A stanchion providing a point of support for a structure which is vertically adjustable with respect to a support surface, said stanchion comprising, in combination, a vertical member with two parallel sides and a central web between and perpendicular to the parallel sides; a plurality of tongues extending from the central web and between the parallel sides to form the teeth of a ratchet; a sleeve slidably positioned on the vertical member and having a closure plate with a slit and which with the sides and the central web of the vertical member forms a four sided chamber; a lever inserted through and pivotable in the said slit and having an inner end within the said chamber and an outer end outside the said chamber; a pawl fixedly attached to and extending downward from the inner end of the lever, said pawl having a width substantially equal to the distance in the said chamber between the sides of the vertical member and a length greater than the distance in said chamber between the central web of the vertical member and the closure plate; a release plate fixedly attached to the outer end of the lever; means for attaching the structure to the sleeve; and means for maintaining the vertical member in a vertical attitude with respect to the support surface.

6. A stanchion for supporting a structure, said stanchion comprising, in combination, a vertical member with a central web; a plurality of thin flat upwardly and outwardly extending ratchet teeth distributed vertically along the central web; a sleeve slidably positionable on the vertical member and having a closure plate with a slit opposite the central web of the vertical member; a lever inserted through and pivotable in the slit and having an inner end between the central web and the closure plate and an outer end more remote from the central web than from the closure plate; a thin flat pawl fixedly attached to and extending downward from the inner end of the lever and having a length greater than the distance between the central web and the closure plate; a release plate fixedly attached to the outer end of the lever; and means for attaching the structure to the sleeve.

7. In a stanchion of the type having a vertical member and a sleeve freely slidable along the length of said vertical member the combination therewith of a plurality of vertically spaced flat upwardly and outwardly extending tongues fixed on said vertical member and a pawl carried by said sleeve and projecting inwardly and downwardly from said sleeve for selective engagement with any one of said tongues, and means for pivoting said pawl to a position free of engagement with any one of said tongues.

8. In a stanchion, a vertical member having two parallel sides and a web between said sides, a plurality of vertically spaced flat upwardly and outwardly extending tongues carried by their lower and inner ends by said web, a sleeve slidably riding on said sides, a lever pivotally carried by said sleeve, a pawl having a flat lower surface extending from said lever inwardly and downwardly toward said web, said lever being pivotable to move said pawl in a downward and outward direction freeing said pawl from engagement with any of said tongues, and means for limiting the inward and upward pivotal movement of said pawl when said pawl is positioned between two of said tongues such that the lower surface of said pawl engages the upper surface of one of said tongues as it projects inwardly and downwardly.

References Cited in the file of this patent

UNITED STATES PATENTS 152,955     Sleeper                July 14, 1874